United States Patent [19]

Irwin et al.

[11] Patent Number: 5,203,861
[45] Date of Patent: Apr. 20, 1993

[54] PLASTIC SPROCKET WHEEL WITH REPLACEABLE TEETH

[76] Inventors: Guy L. Irwin, 512 Oreland Mill Rd., Oreland, Pa. 19075; Andre Robin, 8630 Farley Way, Fair Oaks, Calif. 95628

[21] Appl. No.: 809,869

[22] Filed: Dec. 18, 1991

[51] Int. Cl.⁵ .............................................. F16H 55/12
[52] U.S. Cl. ..................................... 474/161; 474/162
[58] Field of Search ................................. 474/161, 162

[56] References Cited

U.S. PATENT DOCUMENTS 4,752,281  6/1988  Lammers .................... 474/161 X
4,881,930  11/1989  Oertley ............................. 474/162

Primary Examiner—Thuy M. Bui
Attorney, Agent, or Firm—Morrison Law Firm

[57] ABSTRACT

A plastic sprocket wheel includes a sprocket body having a series of circularly spaced recesses located around a body circumferential edge, there also being a body side face opening in at least one body side face which communicates with the recess edge openings so that replaceable tooth elements can be slidably inserted into an associated recess when tooth replacement such as required when one or more teeth of an operating sprocket break or are rendered unusable. The replacement mounting requires no separate fastening devices for holding replacement teeth securely to the sprocket body, friction fit being sufficient to that end. The sprocket body is of resilient material such as an acetal, a polyethylene, a polypropylene etc., and the tooth elements can be of metal or the same material as the sprocket body, or such can be a combination of materials, e.g., a strong metal tooth piece molded in a resilient or plastic material core. Further forms of tooth element/sprocket body constructions are provided for use in and to counter effects in conveyors where right and/or left turn belt runs apply significant laterally directed force to the sprocket tooth elements.

27 Claims, 6 Drawing Sheets

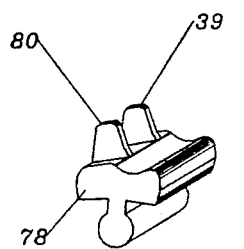 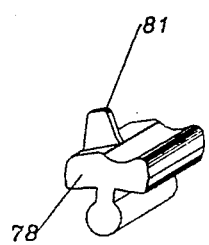 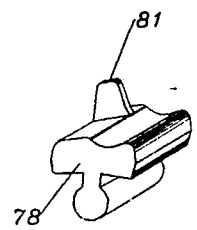
Fig. 6a     Fig. 6b     Fig. 6c
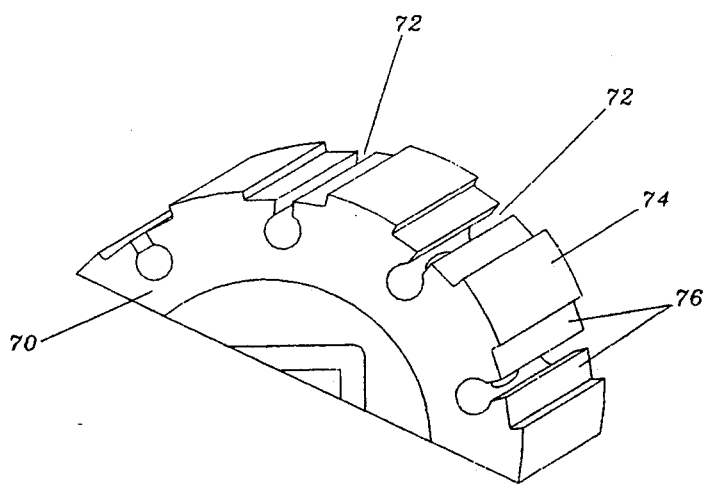
Fig. 7

PLASTIC SPROCKET WHEEL WITH REPLACEABLE TEETH

BACKGROUND OF THE INVENTION

The present invention relates to sprockets for use in conveyor belt and conveyor chain systems and, more particularly, to relatively inexpensive and easily made plastic body sprockets which have replaceable plastic and/or metal teeth so as to enable quick, simple and generally low cost repair to be effected in the commercial/industrial environment when sprocket tooth failure occurs in a conveyor belt or chain installation.

Conveyor belts and chains used in industrial and commercial installations commonly are made of metal or plastic or ceramics. Manufacturers of these belts and chains usually specify that drive sprockets for effecting belt/chain advance be provided at drive locations in numbers of one sprocket per 6 inches of conveyor width so that both adequate conveyor support and drive transmission of the conveyor be achieved. With belt widths most often being three, four or more feet, and with use of sprockets at both ends of a conveyor course, presence of large numbers of sprockets in conveyors is the rule. Totals of 20 or 30 sprockets per conveyor are not unusual.

In recognition that sprocket failure in systems having many sprockets can involve unusually heavy replacement costs, industry generally follows the practice of making sprockets from cheap materials such as plastics or cast iron. The sprockets are made as one-piece components with the view that same are to be discarded when a break therein such as loss of a tooth occurs or, wear renders the sprocket unfit for further use.

It also is known that heavy drive loadings, abrasion, high speed and other factors work effect on sprockets, especially in the food and pharmaceutical industries, which mandate replacement even though no break or wear condition exists since continued use of a given sprocket can produce contamination potentials which cannot be allowed to exist in food/pharmaceutical production lines.

Replacement of sprockets in some instances becomes an almost continuous routine. In many installations access to sprockets is burdensome particularly in respect of having to remove undamaged sprockets from a common drive shaft to get at a damaged one. Actual replacement material and labor costs while not to be minimized are frequently a small cost in comparison to "downtime" losses experienced when a busy and profitable production line must be stopped for a lengthy time to allow sprocket replacement to be effected.

Use of replaceable teeth sprockets in effort to mitigate some of the disadvantages enumerated above is known in the prior art. Instances of and types of replaceable teeth sprockets of which applicants are aware, are for use with metal constructed sprockets and as represented, e.g., by the teachings of U.S. Pat. Nos. 2,038,695; 3,996,814; 3,381,354; 4,308,019; 4,522,611; 4,708,698 and 4,752,281. The devices disclosed in these patents have in common, the use of replaceable teeth or tooth-like elements on a mounting body or hub with mechanical fasteners, these fasteners comprising multiple pieces and in most cases involving some extensive work and piece manipulations to make a replacement.

U.S. Pat. Nos. 655,943 and 3,069,922 also disclose mechanical fastening of replaceable teeth, and while in some ways a little less complicated than the first herein listed group of patents, involve in use labor and costs avoidable if a replacement tooth was simply insertable in place on a wheel or hub without fasteners. U.S. Pat. No. 3,069,993 which discloses insertion of tapered surfaced metal teeth in companion tapered peripheral recesses of a metal cylindrical hub has the added disadvantage of employing small included angle recess defining structure on the hub resulting in inherently weak intersecting surfaces in the recess defining structure promotive of failure during service.

Use of replaceable tooth sprockets employing special fasteners as noted, have the drawbacks of taking unusual time to make replacement, can involve high cost for fasteners, special machining etc. Use of fastener components allows that they can in instances work loose and enter a production line operation. Where sterile and sanitary requirements must be maintained in a system, loose machine parts can contaminate the system. Contamination of a system aside from any repair downtime presents the requirement of reestablishing sterile conditions.

OBJECTS AND SUMMARY OF THE INVENTION

Accordingly, it is an object of the invention to provide a plastic sprocket wheel with replaceable teeth which overcomes the drawbacks of the prior art.

It is a further object of the invention to provide a plastic sprocket wheel having replacement teeth which readily is fabricated inexpensively as a precision component with plastic molding techniques.

It is a still further object of the invention to provide a plastic sprocket with replacement teeth in which tooth replacement is effected in the most efficient, simplified fashion and without recourse to use of mechanical fastening means to hold a replacement tooth securely in place in a sprocket body.

A still further object is to facilitate quick replacement of sprocket teeth so as to minimize conveyor belt/chain system downtime.

A yet further object is to provide a replaceable tooth sprocket particularly suited for use in food and pharmaceutical industry use.

Another object is to provide a replaceable tooth sprocket employing a resilient material sprocket body having a circle of peripheral projections intervened by tooth element receptive recesses, mounting of tooth elements having larger envelopes than those of the recesses in which received causing elastic yielding of projections adjacent tooth element occupied recesses to the effect that mounting of such an element in a last unoccupied recess produces a circular compression force acting around a peripheral band sector of the sprocket body for enhanced retention of the tooth elements in place on the sprocket body.

Briefly stated, there is provided a plastic sprocket wheel which includes a sprocket body having a series of circularly spaced recesses located around a body circumferential edge. Body side face openings also are provided in at least one body side face which side face openings communicate with the recess edge openings so that replaceable tooth elements can be slidably inserted into an associated recess to effect tooth replacement such as when one or more teeth of an operating sprocket break or are rendered unusable. The replacement mounting requires no separate fastening devices for holding replacement teeth securely to the sprocket body, friction fit being sufficient to that end. The sprocket body can be of a resilient material. A selected resilient material can to an extent depend on the manner of sprocket body fabrication, i.e., whether the body is a molded finished piece or a molded piece which is given a post-molding machining. Suitable materials include, but are not limited to an acetal, a polyethylene, a polypropylene, certain amides such as a nylon etc. The tooth elements can of metal such as stainless steel, the same resilient material as used for the sprocket body, a composite of metal and resilient material as well as other materials and/or combinations, e.g., a tooth element could be a composite of a metal tooth piece molded in a resilient or plastic material core. Further forms of tooth element/sprocket body constructions are provided for use in and to counter effects in conveyors where right and/or left turn belt runs apply significant laterally directed force to the sprocket tooth elements.

In accordance with the above noted and other objects of the invention, there is provided a sprocket wheel with removable/replaceable teeth, comprising a resilient material sprocket body having opposite side faces and a circumferential edge surface extending between the side faces, with there being a plurality of recesses in the body extending radially inwardly from openings spaced around said edge surface. Each such recess further is open at least one body side face and has a part narrowed circumferentially relative to its edge surface opening, such narrowed being located inwardly of the body edge surface. A corresponding plurality of tooth elements are provided and associated one with each respective recess, each tooth element including a tooth piece and a base piece, the base piece being receivable in its associated recess with the tooth piece extending radially beyond the sprocket body edge surface. Each base piece is configured complementally to the recess wherein received and has an envelope size larger than an envelope size of its associated recess. The sprocket body is made of a resilient material so that when a base piece is slidably removably inserted into its associated recess through the opening at the at least one body side face, body structure defining the recess is caused to elastically deform to admit the base piece in recess conformable occupancy and in tight frictional base piece external surface-to-recess surface interference fit. Means is associated with each base piece and recess for maintaining said base piece when inserted in the recess, registered therein with an end surface of the base piece aligned with said sprocket body one side face.

In a further aspect, the invention provides a sprocket wheel with removable/replaceable teeth comprising a sprocket body having opposed side faces and a generally circular edge profile extending between said side faces. A plurality of body projections are circularly spaced around the body edge and recesses intervene the projections, with these recesses extending radially inwardly a distance from the edge surface. Each recess passes from side face-to-side face of the body between respective openings thereat, each such recess having a recess envelope of a given dimension. A corresponding plurality of tooth elements are provided, and each includes a tooth piece and a base piece, with each base piece configured complementally to and receivable in a respective one of the recesses, the base pieces having an envelope dimension larger than that of an associated recess. The sprocket body is made of a resilient material so that when a larger envelope dimension base piece is slidably inserted into an associated smaller envelope dimension recess through one side face opening, a projection intervened by said respective one recess and having an unoccupied next adjacent recess is caused to yield elastically diminishing the envelope dimension of any such unoccupied recess, insertion of a last base piece into a last unoccupied recess requiring insertion force sufficient to counter elastic yield imposed on body projections adjacent said last recess tending to restore it to said given envelope dimension whereby there is established with said last base piece insertion a circularly imposed compressive force transmissively acting on all base pieces for securing them tightly in their associated recesses.

The above, and other objects, features and advantages of the present invention will become apparent from the following description read in conjunction with the accompanying drawings, in which like reference numerals designate the same elements.

BRIEF DESCRIPTION OF THE DRAWINGS

FIGS. 6a–6c show further configurations of tooth elements which can be used in the sprocket of the invention;

FIG. 7 is a fragmentary perspective of a sprocket body with which the tooth elements of FIGS. 6a–6c are used;

DETAILED DESCRIPTION OF THE PREFERRED EMBODIMENT

The sprocket wheel of the invention has application to a wide range of conveyor belt and conveyor chain installations for both drive sprocket and idler sprocket requirements. Sprocket wheel embodiments as will be detailed below are suited for conveyors with straight run forward and return courses, as well as for conveyors wherein the forward and return runs transit turns in left and/or right directions so that sideways or lateral loadings act on the sprockets and especially the teeth. The sprocket wheel is characterized by the precision with which it can be fabricated in polymeric based materials, e.g., polyethylene and polypropylene, and in the ultra high molecular weight forms thereof, being especially useful for such purpose.

Further, replacement of a defective tooth from a sprocket wheel body is as simple as it takes to slidably drive the defective tooth from its body received recess with only such force needed to overcome the frictional engagement of the tooth with the recess, and then slidably insert the replacement tooth in the recess with exerted force to establish frictional engagement between the two. Of special efficacy in this regard is the minimum time and effort involved in the replacement procedure. No special tools are required, the sprocket body need not be moved, and accessing the part of the wheel where the work is required is minimized as a consideration.

Figure 1:
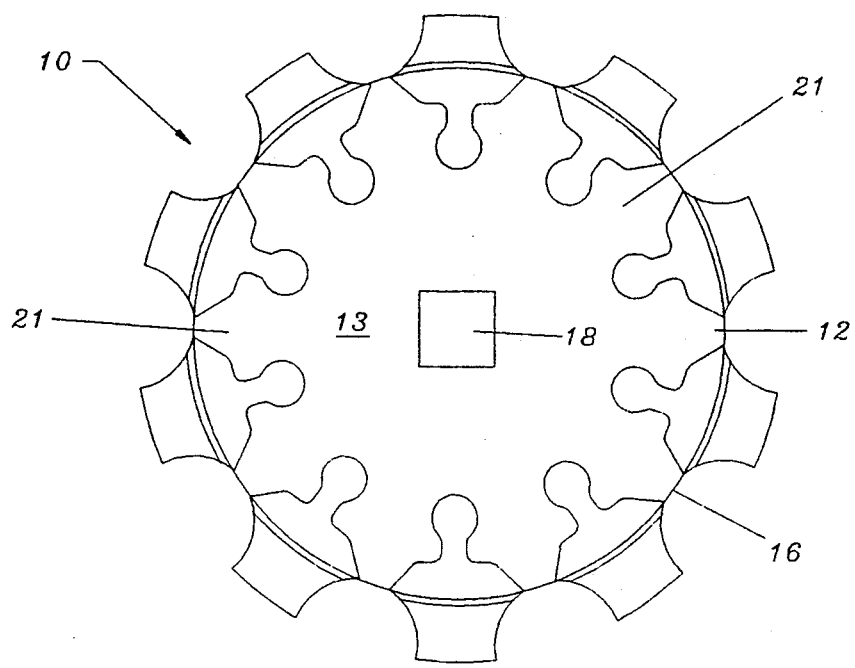
FIG. 1 is a side elevational view of a sprocket constructed in accordance with the invention, the depicted embodiment being one wherein the sprocket has 10 replaceable teeth thereon.
Figure 2:
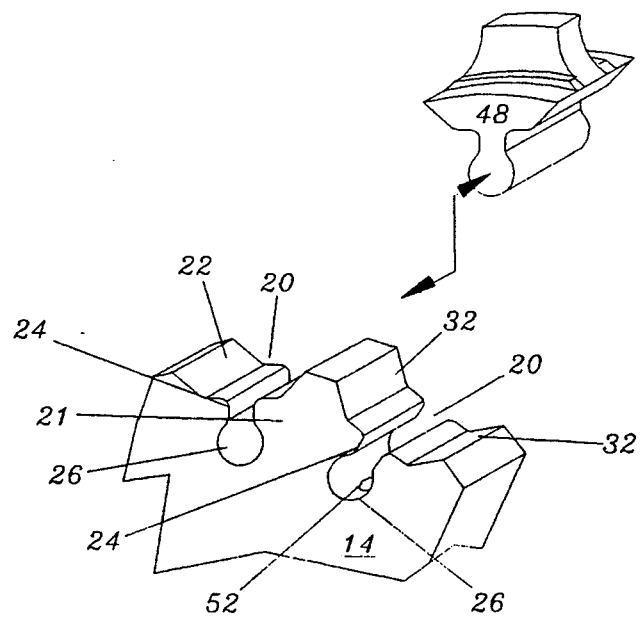
FIG. 2 is an exploded view showing in perspective, a fragmentary peripheral portion of the body of the FIG. 1 sprocket and the recess construction therein, and one of the replaceable tooth elements which can be received in the recess.
Figure 3:
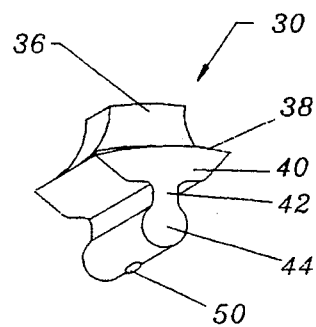
FIG. 3 is a perspective view of the tooth element shown in FIG. 2 as taken from the underside and showing a detent projection carried on a base piece of the tooth element.

Referring now to FIGS. 1-3 which depict a first embodiment of the invention, the sprocket wheel 10 (shown as a 10 tooth sprocket by way of example) includes a sprocket body 12 of resilient, i.e., polymeric based material shaped as a disc having opposite face surfaces 13, 14 and a circumferential edge 16, the body, for example, being bilaterally symmetrical about its longitudinal axis. The sprocket body could be provided in other forms as well, thus, it could comprise a central hub, a peripheral annular part and ribs or spokes joining the annular part T. The hub.

A central opening 18 in the disc is provided for mounting of the sprocket on a drive or idler shaft, the depicted opening 18 being, for example, of square configuration. Other shapes such as circular can be used and key slots incorporated with the opening.

A plurality of recesses 20 (best seen in FIG. 2) are provided at circularly spaced locations around the disk edge surface, these extending radially inwardly of the edge surface from edge openings, and the recesses intervening a like plurality of peripheral projections 21 which define the recesses. The recesses in this embodiment also have or are open at the respective side faces of the disk so that these openings define a disk side face-to-side face recess having a first circularly widened part 22 proximal the edge surface 16, a circumferentially narrower second part 24 radially inwardly of the first part, and a third part 26 circumferentially wider than the second and remote from the first part all as best seen from FIG. 2. The recess third part receives a complementally configured portion of a later described tooth element which being widened relative to recess part 24 anchors the tooth element radially in the sprocket body.

Each recess 20 serves as the space for reception of an associated tooth element 30 in manner as will be given shortly. It is here noted that the recess 20 of depicted form has as its first part 22 a widened region presenting a saddle on which a tooth element is given broad support, this saddle presenting inclined supporting surfaces 32. Second part 24 is of narrower necked-in expanse, and third part 26 is of generally part cylindrical shape. The recess 20 can have other part configurations as will be seen later, it being required only that the part 24 be wider than the part 26 for reason above described. Recess configuration is of course, constant from disk face-to-face.

Each recess 20 slidably removably receives a tooth element 30 therein, this tooth element having a tooth piece 36 which when the element is mounted, extends radially outwardly of the disk edge surface 16 and serves as the conveyor belt/chain engaging member during sprocket rotation. The tooth element also has a base piece 38, the base piece having segments corresponding with and conformably configured to the recess spaces. Thus, it has a widened segment 40, a central segment 42 and a third segment 44, this last-mentioned segment being an anchor segment for the tooth element.

FIG. 1 shows 10 tooth elements (which can be of the same polymer base material as body 12, a metal such as stainless steel, or ceramic) mounted on sprocket body 12, and FIG. 2 indicates how mounting of a tooth element in a recess is effected. In the FIG. 1 embodiment 10, the tooth elements 30 can be inserted from either face 13, 14 of the disk. Since the recess and associated or companion tooth element have complemental surface configurations, the base piece of the tooth element registers with the recess and can be slid into the recess.

This inserted reception of the base piece in the recess is with such surface-to-surface contact between the two that a tight frictional engagement is established between the base piece and the sprocket body and sufficiently so as to hold the tooth element securely in place. Normal usage for the embodiment 10 is where generally straight conveyor runs or conveyor runs where deviation from straight line runs is only slight and, thus no significant lateral loading will be imposed on the tooth elements.

As used herein, "tight frictional" engagement will be understood as meaning a condition of interfitted surface engagement or relationship between tooth element base piece external surfaces and the sprocket surfaces defined by the envelope of the recess 20. This condition will exist based on a dimensional consideration of providing recess base piece external surface to recess surface envelopes dimensional differential varying plus 0.0005 inch up to 0.002 inch greater base piece envelope dimension than a given recess envelope dimension. This assures that a last fitted tooth element on a sprocket wheel gives a "keystone" fit. This keystone fit is facilitated by the elasticity of the sprocket body material as it is displaced by oversized tooth element base piece insertion or mounting. This produces with insertion of the last tooth, a sprocket body under compression loading at an outer rim or band thereof, that will maintain a rigid sprocket wheel shape and ensure retention of the teeth on the body. Achievement of the envelope dimensional relationship is without difficulty in view of the precision molding practices present in the art.

Figure 10:
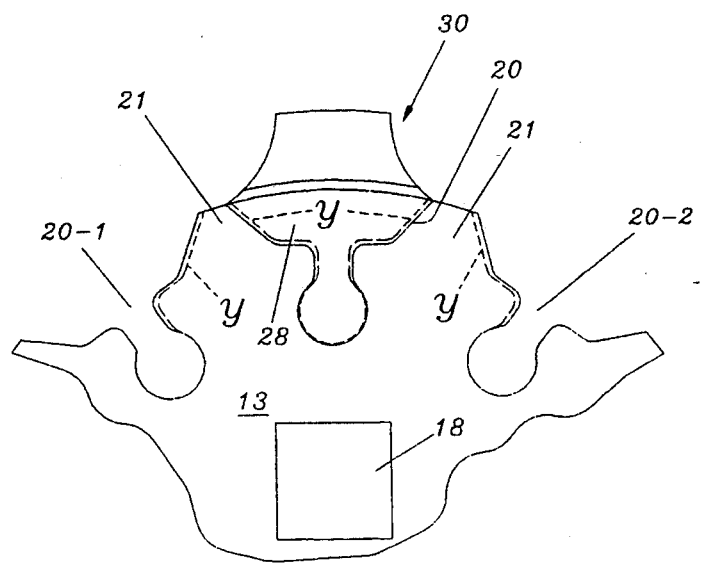
FIG. 10 is a side elevational view on enlarged scale of a fragmentary peripheral portion of a sprocket according to the invention, and depicting the flexing or elastic yielding of a body projection when a tooth element is mounted in a recess and a next adjacent recess is unoccupied.

Establishment of this circular band compression loading on the tooth elements is further elaborated now and with reference to FIG. 10. In that Figure, a first tooth element 30 is shown in its associated recess 20. The recess envelope dimension is between about 0.0005 to 0.002 inch smaller than the envelope dimension of the base piece 38. With the insertion of the base piece, the projections 21 adjacent that recess are caused to elastically yield or widen slightly circularly, moving from the dashed line position Y to solid line position to thus accommodate entry of the base piece. This yield Y is possible because the recesses 20-1 and 20-2 are unoccupied. As tooth element insertion progresses around the sprocket body, one adjacent recess to a base piece receiving recess will already be occupied so it is the other unoccupied adjacent recess that will undergo the elastic yield.

When only a last recess is unoccupied, it will have an envelope that will be smaller than its given dimension because projections 21 on each side thereof will have been subjected to elastic yielding from insertion of tooth element base pieces in the adjacent recesses on each side of the last one. Insertion of a base piece in this last recess will require greater force than for other insertions because of the even greater envelope dimension differentials here present. Entry edges of the base piece here involved can be beveled to a certain extent to facilitate insertion.

Completion of insertion of this last base piece produces imposition of circular loading opposed to the yield loading with the result that the insertion sets up a circular compression loading or "keystone" effect around the entire sprocket body at the band region thereof which includes the projections 21 and base pieces 38. This loading is of some order and is effective to hold the tooth elements secured to the sprocket body against all but the most severe side loadings acting on the teeth and tending to slide them out of the recesses.

The embodiment 10 tooth element 30 will have axial length the same as the thickness of the disk and opposite end faces of the base piece, e.g., end face 48 should be flush with one of the side faces of the disk. Proper locating of a tooth element in this regard is required to insure that the tooth piece 36 of each properly enters the conveyor structure where required.

Positioning or proper axial registration of the tooth element in the recess to assure the foregoing is provided by detent means associated with each tooth element and recess. This detent means can comprise a projection 50 (FIG. 3) at the underside of tooth element base piece segment 44, and a depression 52 in the sprocket body at the inner reach of the recess third part 26 (FIG. 2). The means could involve a reversal of the structure, i.e., the depression could be on the base piece, and the projection in the recess.

The detent means in addition to locating the tooth element longitudinally in the recess, can also add to the retention securement of the tooth element in the sprocket body. Since both the sprocket body and the segment 44 carrying the projection possess the resiliency characteristics of polymeric material, insertion and removal of the base piece is not impeded by the presence of the detent structure as sufficient yielding or give in the material can take place to accommodate base piece entry and removal. The same is true where a wholly metal tooth is used due to the resilient nature of the sprocket body material.

In certain applications and particularly in pharmaceutical and food industry conveyor systems, sprockets are commonly exposed to heavy loadings, high production and hence, high speed sprocket demands, and also to chemical cleaning operations involving use of caustic and harsh cleaners all of which dictate use of corrosion resistant sprockets and frequently use of expensive stainless steel sprockets. Plastic sprockets can deal with the corrosion problem but not with the loadings and wear impact such service imposes on the sprocket teeth.

Figure 4:
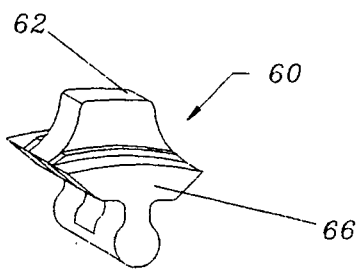
FIG. 4 is a perspective view of another form of tooth element which can be used in the sprocket, the tooth element being of composite metal/thermoplastic construction.
Figure 5:
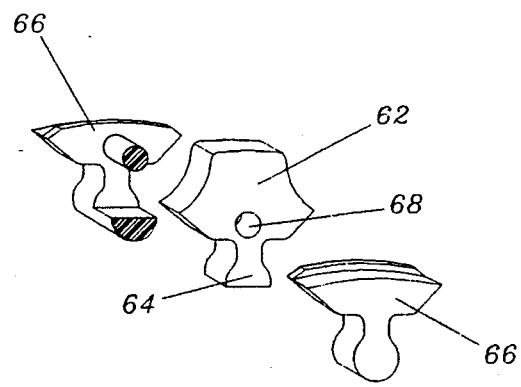
FIG. 5 is an exploded view of the tooth element shown in FIG. 4.

The invention deals with a replaceable tooth sprocket forms particularly effective to overcome the above referred to prior sprocket shortcomings, one such being use of entirely stainless steel teeth as described with reference to the first embodiment. In another embodiment to that purpose, the same sprocket body as depicted in FIGS. 1-3 is used, but with a heavy duty tooth element 60 in place of the prior described element 30. With reference to FIGS. 4 and 5, tooth element 60 is a composite structure comprised partly of stainless steel or other rugged corrosion resistant metal, and the balance being of the resilient polymeric materials heretofore noted.

Tooth element 60 includes, as seen from FIGS. 4 and 5, a tooth piece 62 of, e.g., stainless steel which tooth piece has a root 64 extending downwardly so as to be embedded in the material of base piece segment 66. Side faces of the root 64 and lower side face areas of the tooth piece are sandwiched between resilient material portions of the base piece segments. In effect, the stainless steel component is a core of the resilient material mass constituting the base piece, a core which has a tooth piece extending radially beyond the disk edge surface for belt engagement purpose and to which this enhanced strengthened component was selected.

FIG. 5 is an exploded view of the tooth element which serves to illustrate to those of ordinary skill in the art how the tooth element can be fabricated. The tooth piece 62 and its integral root 64 can be set in a mold, the tooth piece having a passage as at 68 formed therethrough. The mold in which it is set is configured to mold an element base piece, and thus when resilient material is introduced into the mold and molded, such material will run into and invest the passage 68 anchoring the root to the base piece.

The root it will be noted extends only a distance into the segment 66 so that a major portion of the external surface of the base piece in this embodiment is of resilient material.

Ceramic material also could be used in a FIG. 5 type tooth element construction, particularly in respect of applications involving severe tooth wear problems inasmuch as modern ceramics technology provides ceramic compositions with outstanding wear properties.

Numbers of variations in the size and shape of the sprocket body, and of the tooth element configurations as to the tooth piece are possible in accordance with the invention. Such is exemplified with reference to FIGS. 6a-6c and 7. As seen from FIG. 7, a sprocket body 70 can have a recess 72 in which the parts thereof proximal the body edge surface 74 and serve as tooth element saddles need not be inclined but rather be flat as at 76. The other two recess parts in this case are the same as those in embodiment 10.

FIGS. 6a-6c show tooth elements for use with sprocket body 70 all these having a base piece segment 78 configured to sit in the flats 76 of the body. FIG. 6a shows a tooth element in which the tooth piece is of twin piece character, having belt engaging pieces 79, 80, the pieces being symmetrical relative to the opposite end faces of the tooth element base piece. FIGS. 6b and 6c show, respectively, placement of a tooth piece 81 nearer to one of the two opposite ends of the base piece than the other end. Location placement of the tooth piece on the base piece as well as given tooth piece shape, height, size etc are matters dictated by the particular configuration and construction of conveyor belt with which the sprocket is used.

Figure 8:
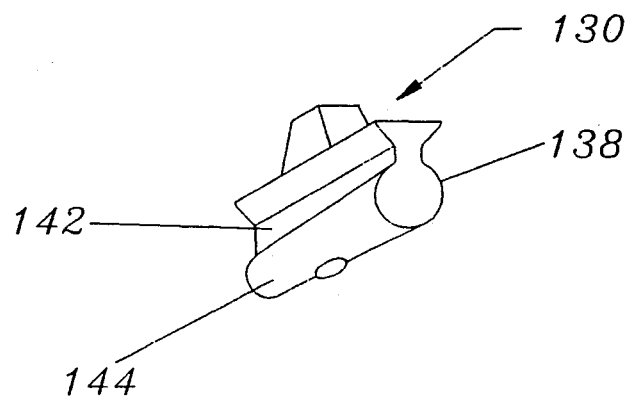
FIG. 8 is a perspective view of another tooth element form wherein the base piece of the tooth element is tapered so as to conform with a like tapered sprocket body recess part to thereby enhance holding of the tooth element in place in the body.
Figure 9:
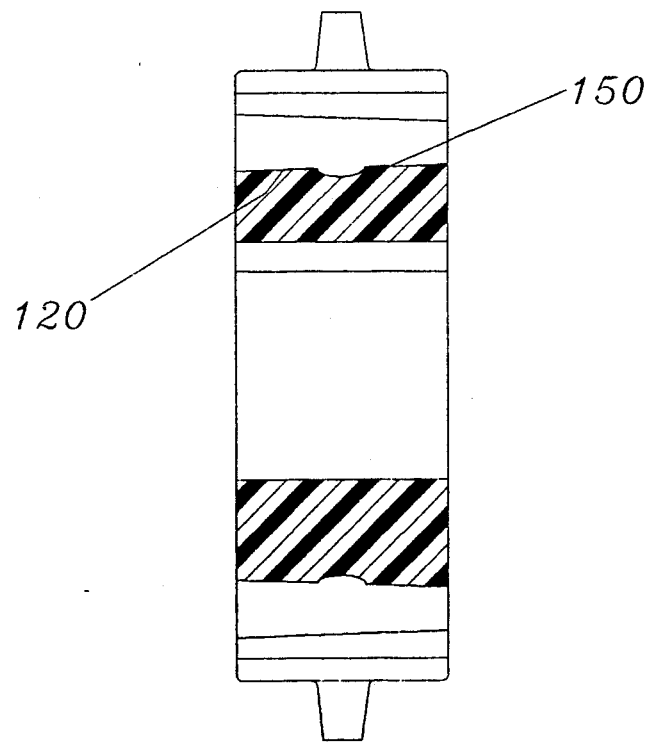
FIG. 9 is a vertical central sectional view of a sprocket body with which the tooth element of FIG. 9 is used.

In circumstances where a replaceable tooth sprocket is used with a sideflexing chain or belt conveyor, i.e., where the belt course undergoes pronounced right or left course deviations, very high loadings on the tooth could under a certain circumstance displace a tooth element from its registered in recess position. FIGS. 8 and 9 depict a sprocket wheel construction for dealing with that possibility.

Referring now to those Figures, tooth element 130 includes a base piece 138 which includes a segment 144 having a taper, this being evident from the diminishing dimension of the segment 142. Companion tapering will be formed in the associated sprocket body recess 120, e.g., as at 150 (FIG. 9). With matching tapers on the base piece and in the recess, a base piece once inserted cannot be forced outwardly of the recess by sideflexing loading imposed thereon in the same direction as which insertion was made. The sprocket wheel would of course be suitably oriented to effect insertion from the side where loading will come.

Another embodiment of sprocket wheel which takes into account imposition of sideflexing loadings on tooth elements and provides effective and sufficient countering of that condition is depicted in and will be described with reference to FIGS. 11-13.

Figure 11:
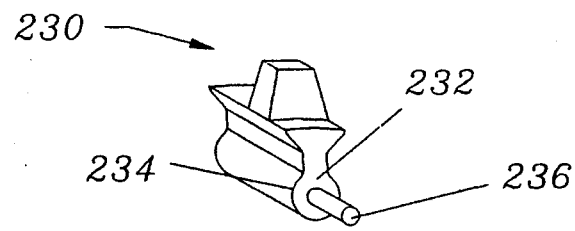
FIG. 11 is a perspective view of a tooth element form used in a sprocket wheel embodiment specially suited for use in countering both left and right conveyor side-flexure loadings on the tooth elements.

Turning now to FIG. 11, tooth element 230 generally is like that shown in FIGS. 1-4 except, it includes an extension 236 disposing longitudinally of an end face 232 of the tooth element base piece 234. FIG. 12 shows a sprocket body 212 having recesses 220 like those depicted in embodiment 10 and extending bodywise from body face 213. The sprocket body also includes a flange 280 which defines an opposite body face 214. The sprocket body 212 includes an inner face as at 240 which has portions facing each recess, and these facing portions serve as stop surfaces against which tooth base pieces 234 abut when tooth elements are mounted in the recesses. This provides a tooth element registration in certain positionings thereof in the sprocket body when mounted.

Figure 13:
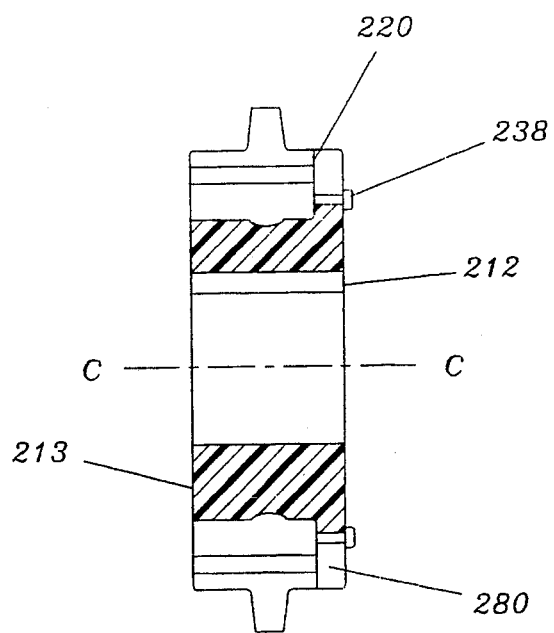
FIG. 13 is a vertical central sectional view of a sprocket wheel in which the FIG. 11 tooth elements are mounted in a FIG. 12 sprocket body.

The portions of the flange facing the recesses are provided with narrow radial slots 288 extending from the body edge surface a distance toward the body center as at C—C in FIG. 13. These slots 288 are widened as at 290 for reception pass through of the base piece projections 236. Once passed through the widenings 290, the projections can be flattened or headed as at 238 shown in FIG. 13 so that the heads 238 prevent withdrawal of a mounted tooth element from a recess.

Figure 12:
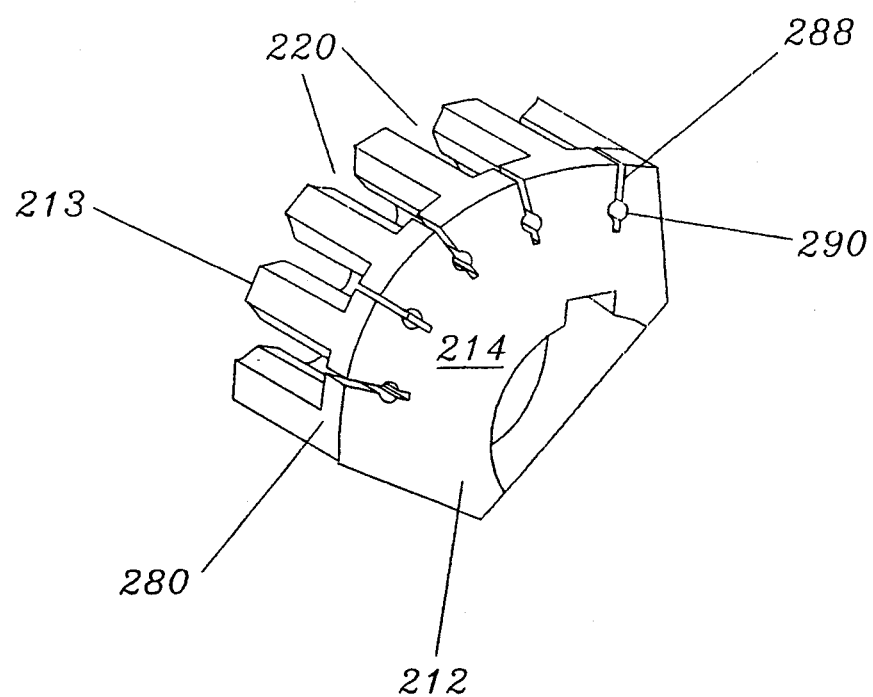
FIG. 12 is a fragmentary perspective view of a peripheral portion of a sprocket body used with the tooth element of FIG. 11, the sprocket body having a flange at one side face thereof with the flange being radially slotted centrally in parts thereof facing the recesses formed in the body.

With the arrangement of FIGS. 11-13, a tooth element mounted on the sprocket body can resist any sideflexing loading thereon whether from a right turn or left turn condition in a conveyor belt. The end face of the base piece in abutment with the inner surface of the flange bars movement from registered position in one direction of the tooth element, and the head 238 bars movement in an opposite direction.

In connection with use of radial slots 288, these facilitate resilient yielding of the structure of the sprocket body peripheral portion intervening successive ones of the recesses to allow for the slidable insertion of tooth elements and ultimate "keystone" compressive holding force acting on mounted tooth elements as earlier described.

Reference herein to "resilient material" is additionally to ones of such specifically noted, intended to include acetals, polycarbonates as well as similar and like comprised materials both with and without additives and fillers thereto.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A sprocket wheel with removable/replaceable teeth, said sprocket wheel comprising
    a sprocket body having opposite side faces and a circumferential edge surface extending between said side faces, there being a plurality of recesses extending radially inwardly from openings spaced around said edge surface, with each recess opening at at least one of said side faces, each recess having a part narrowed circumferentially relative to its edge surface opening and located radially inwardly of the body edge surface,
    a corresponding plurality of tooth elements associated one with each respective recess, each tooth element including a tooth piece and a base piece, the base piece being receivable in its associated recess with the tooth element extending radially beyond the sprocket body edge surface, said base piece being configured complementally to the recess wherein received, the base piece having an envelope size larger than an envelope size of its associated recess, the sprocket body being made of a resilient material so that when said base piece is slidably removably inserted into its associated recess through the opening at the at least one body side face, body structure defining said recess is caused to elastically yield to admit said base piece in recess conformable occupancy and in tight frictional base piece external surface-to-recess surface interference fit, and
    means associated with each base piece and recess for maintaining the base piece when inserted in the recess, registered therein with an end surface of the base piece aligned flush with said sprocket body one side face.

2. A sprocket wheel in accordance with claim 1 in which each recess in the sprocket body has openings at both sprocket body side faces, the base piece of an associated tooth element being slidably removably insertable into the recess through either side face opening.

3. A sprocket wheel in accordance with claim 1 in which the interference fit is based on a base piece envelope dimension in a range about 0.0005 inch to about 0.002 inch greater than the envelope dimension of an associated body recess.

4. A sprocket wheel in accordance with claim 1 in which the sprocket body resilient material is polymeric based.

5. A sprocket wheel in accordance with claim 4 in which the tooth element is of metal.

6. A sprocket wheel in accordance with claim 5 in which the metal is one having corrosion resistance properties.

7. A sprocket wheel in accordance with claim 6 in which the metal is stainless steel.

8. A sprocket wheel in accordance with claim 4 in which the polymeric material is a polyethylene.

9. A sprocket wheel in accordance with claim 4 in which the polymeric material is a polypropylene.

10. A sprocket wheel in accordance with claim 4 in which at least a major portion of the tooth element is made of a resilient material.

11. A sprocket wheel in accordance with claim 10 in which each tooth element is made entirely of a resilient material.

12. A sprocket wheel in accordance with claim 10 in which the tooth element resilient material is the same as that of the sprocket body.

13. A sprocket wheel in accordance with claim 10 in which each tooth element is a composite structure in which the tooth piece is a metallic component and includes a root extending into a resilient material tooth base piece and anchored thereto.

14. A sprocket wheel in accordance with claim 13 in which the tooth piece root includes a bore passage therein, the base piece being a molded member including a molded mass filling said bore passage.

15. A sprocket wheel in accordance with claim 13 in which the tooth piece is of a metal having corrosion resistance properties.

16. A sprocket wheel in accordance with claim 15 in which the tooth piece metal is stainless steel.

17. A sprocket wheel in accordance with claim 1 in which at least a portion of each recess is tapered in a direction away from its at least one body side face opening toward the other body side face, the tooth element base piece receivable therein being companionly tapered.

18. A sprocket wheel in accordance with claim 1 in which the means for maintaining a base piece registered in its recess comprises a projection carried by one of each recess and associated base piece, and a depression carried by the other which can be invested by the projection when the base piece is received detent registered in its associated recess.

19. A sprocket wheel with removable/replaceable teeth, said sprocket wheel comprising a sprocket body having opposed side faces and a generally circular edge profile extending between said side faces, there being a plurality of body projections circularly spaced around the body edge with recesses intervening the projections and extending radially inwardly a distance from the edge surface, each recess passing from side face-to-side face of the body between respective side face openings thereat, each recess having an envelope of a given dimension, and a corresponding plurality of tooth elements, each tooth element including a tooth piece and a base piece, each base piece being configured complementally to and receivable in a respective one of the recesses and having an envelope dimension larger than that of its associated recess, said sprocket body being made of a resilient material so that when a larger envelope dimension base piece is slidably removably inserted into an associated smaller envelope dimension recess through one side face opening, a projection intervened by said respective one recess and having an unoccupied next adjacent recess is caused to yield elastically diminishing the envelope dimension of any such unoccupied recess, insertion of a last base piece into a last unoccupied recess requiring insertion force sufficient to counter elastic yield imposed on body projections adjacent said last recess tending to restore it to said given envelope dimension whereby there is established with said last base piece insertion a circularly imposed compressive force transmissively acting on all base pieces for securing them tightly in their associated recesses.

20. A sprocket wheel in accordance with claim 19 in which the tooth element base piece envelope dimension is about 0.0005 to about 0.002 in greater than the recess envelope given dimension.

21. A sprocket wheel in accordance with claim 19 in which the resilient material is polymer based.

22. A sprocket wheel in accordance with claim 21 in which the polymer is one of a polyethylene and a polypropylene.

23. A sprocket wheel in accordance with claim 21 in which the tooth element is made of a metal.

24. A sprocket wheel in accordance with claim 21 in which at least a major portion of each base piece is made of the same polymer as the sprocket body.

25. A sprocket wheel in accordance with claim 1 further comprising a flange at the body side face opposite said one side face, said flange including an inner surface defining a stop in each recess in the body against which a tooth element base piece end surface opposite the first-mentioned end surface can abut when a said tooth element base piece is received in its associated recess in registered position therein, said flange at portions thereof facing recesses having a radial slot extending a defined distance from the sprocket body edge surface toward a sprocket body center.

26. A sprocket wheel in accordance with claim 25 in which each tooth element base piece includes a stub projection extending longitudinally of said opposite end surface, said flange recess facing portions including widened radial slot parts receptive of said stub projection so that said stub projection can extend axially beyond said flange.

27. A sprocket wheel in accordance with claim 26 in which the stub projection extending axially beyond the flange is headed enlarged relative to the widened radial slot parts so that withdrawal of a tooth element from its associated recess from a side of the flange opposite said enlarged head is precluded.

* * * * *